(12) United States Patent
Kinugasa et al.

(10) Patent No.: US 10,800,491 B2
(45) Date of Patent: Oct. 13, 2020

(54) SUSPENSION, AND STRADDLE-TYPE VEHICLE, SNOW MOBILE, AND ALL-TERRAIN VEHICLE WITH THE SUSPENSION

(71) Applicant: Yamaha Hatsudoki Kabushiki Kaisha, Shizuoka-ken (JP)

(72) Inventors: Takeshi Kinugasa, Japan (JP); Takashi Imamura, Japan (JP); Kensuke Kamada, Japan (JP); Ryuta Koshiishi, Japan (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 221 days.

(21) Appl. No.: 16/056,550

(22) Filed: Aug. 7, 2018

(65) Prior Publication Data

US 2019/0047661 A1 Feb. 14, 2019

(30) Foreign Application Priority Data

Aug. 8, 2017 (JP) .................................. 2017-153034

(51) Int. Cl.
*B62M 27/02* (2006.01)
*B62K 25/24* (2006.01)

(52) U.S. Cl.
CPC ............. *B62M 27/02* (2013.01); *B62K 25/24* (2013.01); *B62M 2027/025* (2013.01); *B62M 2027/026* (2013.01)

(58) Field of Classification Search
CPC .............................. B62M 27/02; B62K 25/24
See application file for complete search history.

(56) References Cited

U.S. PATENT DOCUMENTS

| 8,360,449 B2 * | 1/2013 | Polakowski | B60G 7/02 280/86.751 |
| 2017/0217540 A1 * | 8/2017 | Sawai | B62B 17/04 |

FOREIGN PATENT DOCUMENTS

| CA | 2956614 A1 | 8/2017 |
| JP | 2010-132185 A | 6/2010 |
| JP | 2010-132186 A | 6/2010 |
| JP | 2010-132187 A | 6/2010 |

OTHER PUBLICATIONS

Office Action dated Sep. 16, 2019, for corresponding CA Patent Application No. 3,013,730.

* cited by examiner

*Primary Examiner* — Faye M Fleming
(74) *Attorney, Agent, or Firm* — HEA Law PLLC (57) ABSTRACT

An upper arm projected line L5 is defined as a straight line formed by projecting an upper arm line L3 onto the projection line P1. a lower arm projected line L6 is defined as a straight line formed by projecting the lower arm line L4 onto the projection line P1. An intersection point Px1 between the upper arm projected line L5 and the lower arm projected line L6 is located in a region A1 defined higher than the horizontal plane P2 and defined farther outward in the right-left direction than the ski 4. The suspension enables turning performance of the straddle-type vehicle to be improved.

13 Claims, 9 Drawing Sheets

FIG.9

SUSPENSION, AND STRADDLE-TYPE VEHICLE, SNOW MOBILE, AND ALL-TERRAIN VEHICLE WITH THE SUSPENSION

CROSS-REFERENCE TO RELATED APPLICATION

The present application claims priority from Japanese application JP2017-153034 filed on Aug. 8, 2017, the content of which is hereby incorporated, in its entirety, by reference into this application.

BACKGROUND OF THE INVENTION

1. Field of the Invention

The present invention relates to a suspension, and a straddle-type vehicle, a snow mobile, and an all-terrain vehicle including the suspension.

2. Description of the Related Art

As shown in JP2010-132185A, JP2010-132186A, and JP2010-132187A, snow mobiles include a suspension that comprises knuckles joined with right and left skis, upper arms extending rightward or leftward from the vehicle body frame to be joined to the knuckles, lower arms extending rightward or leftward from the vehicle body frame to be joined to the knuckles, and dampers.

Suspensions of all-terrain vehicles also include knuckles joined with right and left wheels, upper arms, lower arms, and dampers.

SUMMARY OF THE INVENTION

When a vehicle turns, a centrifugal force acts on the vehicle body, which increases the weight applied on one vehicle body supporting member located on outer side of the vehicle body. (In the present specification, the "vehicle body supporting member" means a member, such as a ski or tire, that is in contact with snow surface or road surface, and supports the vehicle body through a suspension.) For example, when a snow mobile turns to the right, a force due to the centrifugal force acts on the right portion of the vehicle body, which raise the right portion and increases the weight applied on the left ski.

An object of the present disclosure is to propose a suspension, a straddle-type vehicle, a snow mobile, and an all-terrain vehicle that are capable of improving turning performance of the vehicle.

(1) A straddle-type vehicle which includes a suspension proposed in the present description includes a vehicle body frame and a vehicle body supporting member including a lower end to be in contact with a snow surface or a road surface. The suspension comprises: a right suspension mechanism located rightward from the vehicle body frame; and a left suspension mechanism located to the left of vehicle body frame. Each of the right suspension mechanism and the left suspension mechanism comprises a knuckle joined to the vehicle body supporting member; an upper arm including an upper proximal portion joined to the vehicle body frame, and an upper joint portion joined to the knuckle, the upper arm being movable up and down around a first straight line passing through the upper proximal portion; and a lower arm disposed under the upper arm, the lower arm including a lower proximal portion joined to the vehicle body frame and a lower joint portion joined to the knuckle, the lower arm movable in an up and down direction around a second straight line passing through the lower proximal portion. A third line is a straight line that passes through the upper joint portion, intersects the first straight line, and is perpendicular to the first straight line. A fourth line is a straight line that passes through the lower joint portion, intersects the second straight line, and is perpendicular to the second straight line. A fifth line is a straight line in an imaginary plane perpendicular to a front-rear direction of the vehicle and formed by projecting the third line onto the imaginary plane. A sixth line is a straight line in the imaginary plane and formed by projecting the fourth line onto the imaginary plane. A first region is defined higher than a horizontal plane passing through the lower end of the vehicle body supporting member and defined outside of the vehicle body supporting member in a right-left direction of the vehicle body. A second region is defined lower than a horizontal plane that passes through the lower end of the vehicle body supporting member and is defined on a side opposite to the vehicle body supporting member across a center of the vehicle body in the right-left direction. A first intersection point that is a point of intersection between the fifth line and the sixth line is located in the first region or the second region. The suspension described above enables turning performance of the straddle-type vehicle to be improved.

(2) In the suspension described in part one above, the upper joint portion may be deviated in position from a vertical line that passes through the lower joint portion.

(3) In the suspension described in parts one or two above, no flat plane may contain both of the third straight line and the fourth straight line.

(4) In the suspension described in any one of parts one to three above, a second intersection point is located lower than the horizontal plane that passes through the lower end of the vehicle body supporting member, where the second intersection point is a point of intersection between a vertical plane at a center of the vehicle body in the right-left direction and a seventh line, and where the seventh line is a straight line that passes through both the first intersection point and a point corresponding to the lower end of the vehicle body supporting member projected onto the imaginary plane.

(5) In the suspension described in part four above, a distance between the second intersection point and the horizontal plane may be equal to or lower than 20 millimeters. This enables turning performance of the straddle-type vehicle to be further improved.

(6) In the suspension described in any one of parts one to five above, the lower proximal portion is located closer to the center in the right-left direction of the vehicle body than the upper proximal portion.

(7) In the suspension described in any one of parts one to six, in a front view of the vehicle body, the fifth line may extend diagonally, downward and outside, in the right-left direction, of the vehicle body from the upper proximal portion. This enables the height of the knuckle to be reduced.

(8) In the suspension described in part seven above, an angle between the sixth line and the horizontal plane may be smaller than an angle between the fifth straight line and the horizontal plane.

(9) In the suspension described in any one of parts one to six above, in a front view of the vehicle body, the sixth line may extend diagonally, upward and outside, in the right-left direction, of the vehicle body from the lower proximal portion, and an angle between the fifth line and the horizontal plane may be larger than an angle between the sixth line and the horizontal plane.

(10) The straddle-type vehicle proposed in the present description comprises the suspension described in any one of parts one to nine, the vehicle body frame, and the vehicle body supporting member. This straddle-type vehicle enables the turning performance of the vehicle to be improved.

(11) In the straddle-type vehicle described in part ten above, the vehicle body frame may include a front portion joined to the lower proximal portion and the upper proximal portion, and a horizontal plane that contains the lower end of the vehicle body supporting member may have a distance equal to or larger than 120 millimeters from a lower end of the front portion of the vehicle body frame.

(12) A snow mobile proposed in the present description comprises the suspension described in any one of parts one to nine above, the vehicle body frame, and a ski as the vehicle body supporting member.

(13) An all-terrain vehicle proposed in the present description comprises the suspension described in any one of parts one to nine above, the vehicle body frame, and a wheel as the vehicle body supporting member.

BRIEF DESCRIPTION OF THE DRAWINGS

The following drawings illustrate examples of various components of the invention disclosed herein, and are for illustrative purposes only.

DETAILED DESCRIPTION OF THE INVENTION

A suspension and a straddle-type vehicle proposed in the present disclosure will be explained in the following description. The straddle-type vehicle is, for example, a snow mobile, or an all-terrain vehicle (ATV). The straddle-type vehicle may also be a three-wheeled vehicle having two front wheels and one rear wheel.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques are disclosed. Each of these has individual benefit and each can also be used in conjunction with one or more, or in some cases all, of the other disclosed techniques. Accordingly, for the sake of clarity, this description will refrain from repeating every possible combination of the individual techniques in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
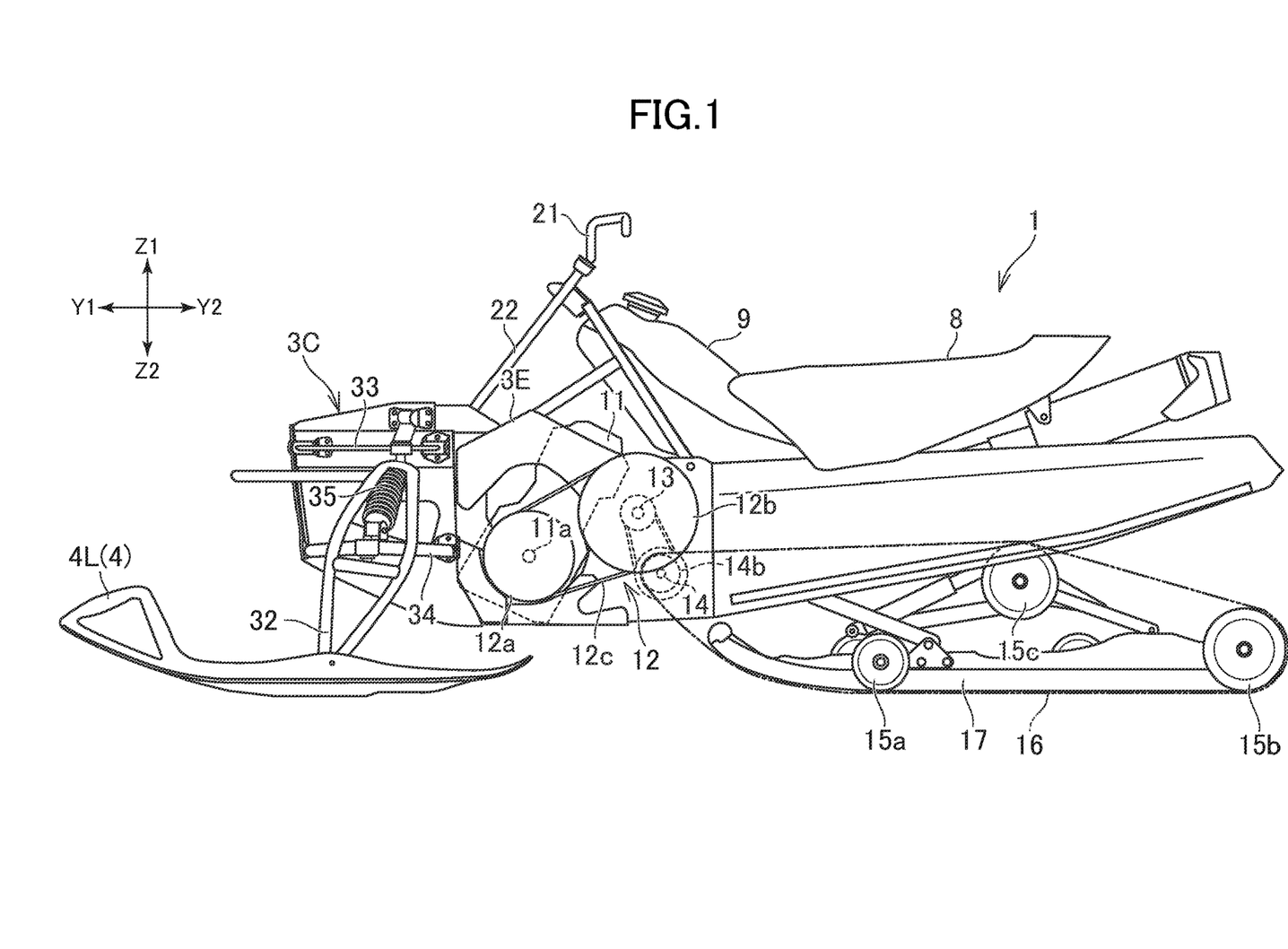
FIG. 1 is a side view showing a snow mobile including an example of a suspension proposed in the present disclosure.
Figure 2:
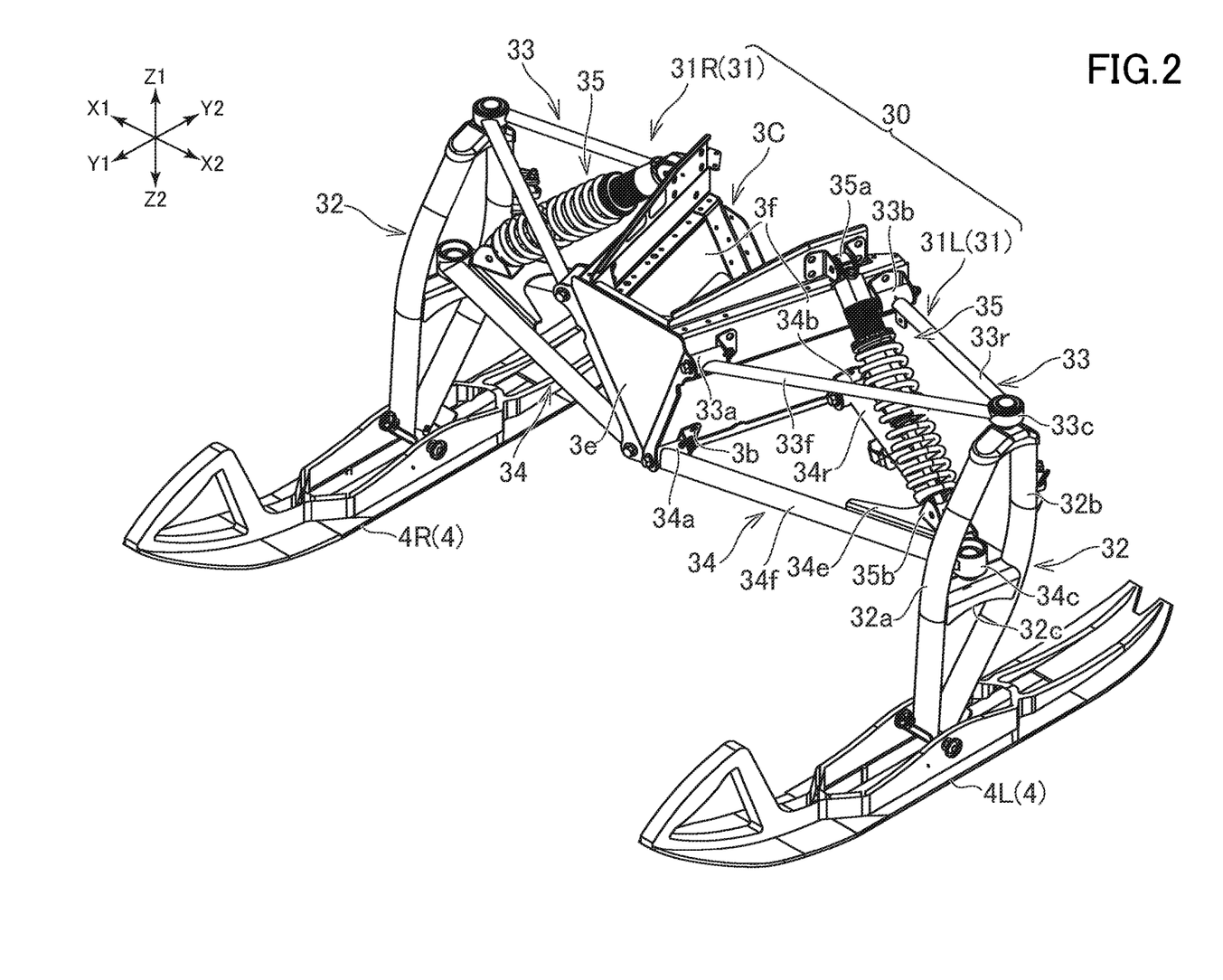
FIG. 2 is a perspective view showing an example of the suspension proposed in the present disclosure.
Figure 3:
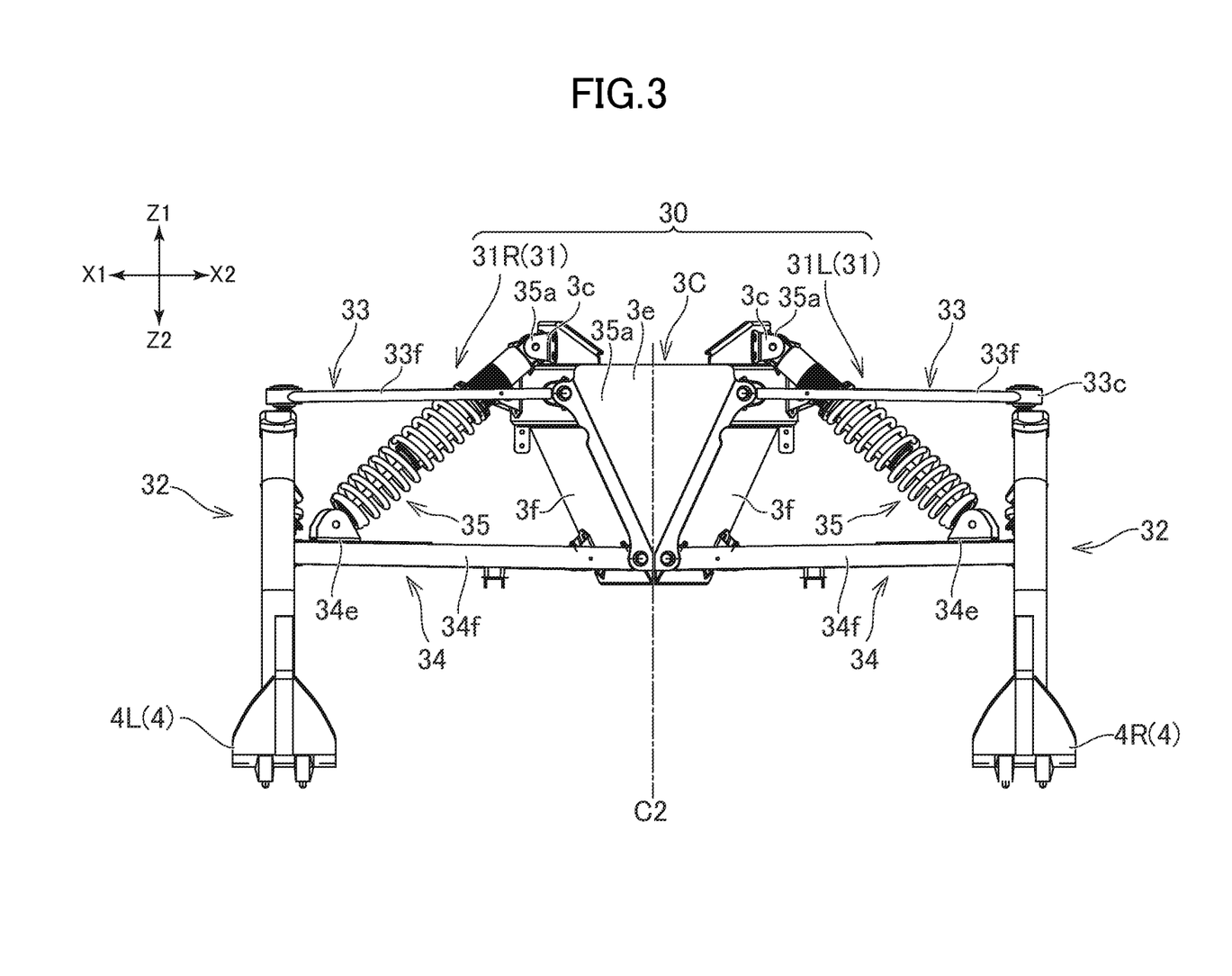
FIG. 3 is a front view showing an example of the suspension.
Figure 4:
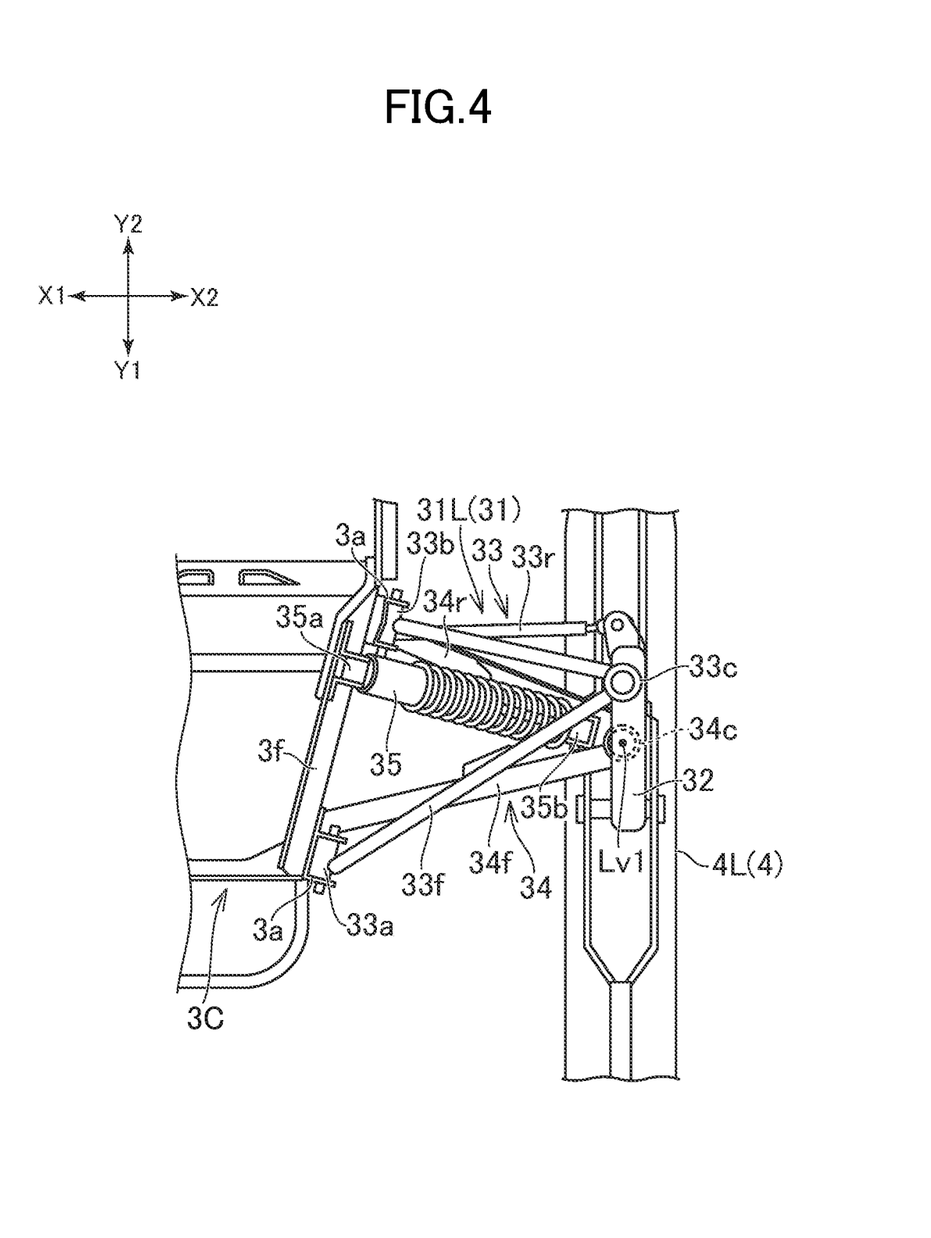
FIG. 4 is a plan view showing an example of the suspension.

FIG. 1 is a side view of a snow mobile 1 including a suspension 30 which is an example of the suspension proposed in the present disclosure. FIG. 2 is a perspective view showing the suspension 30. FIG. 3 is a front view showing the suspension 30. FIG. 4 is a plan view of the suspension 30. In the following description, the directions indicated by Y1 and Y2 in those figures will be referred to as the forward direction and the rearward direction, respectively. The directions indicated by Z1 and Z2 are referred to as the upward direction and downward direction, respectively. The directions indicated by X1 and X2 are referred to as rightward direction and leftward direction, respectively.

As shown in FIG. 1, the snow mobile 1 includes a track belt 16 in the rear portion of the snow mobile 1. Further, the snow mobile 1 includes a driving system for driving the track belt 16. In the example of the snow mobile 1, the drive system includes an engine 11, a transmission 12, a secondary shaft 13, and a track belt drive shaft 14.

As shown in FIG. 1, the engine 11 includes a crankshaft 11a in the lower portion of the engine 11. The engine 11 has a cylinder (not shown) formed therein. In the example, the engine 11 is arranged such that the axis of the cylinder is inclined rearward. In the example, the engine 11 is located farther rearward than the suspension 30, which is described later. The snow mobile 1 includes a fuel tank 9 that stores fuel for the engine 11. The fuel tank 9 is disposed, for example, upwards from the engine 11. The arrangement of the engine 11 and the fuel tank 9 is not limited to the example in the snow mobile 1. In another example, the front portion of the engine 11 may be positioned between a right suspension mechanism 31R (see FIG. 2) and a left suspension mechanism 31L (see FIG. 2) that constitute the suspension 30. In still another example, the snow mobile 1 may include an electric motor as a driving source thereof instead of the engine 11, or an electric motor may be included together with the engine 11 as a driving source.

As shown in FIG. 1, the transmission 12 is, for example, a continuously variable transmission (CVT). In the example, the transmission 12 includes a driving pulley 12a, a driven pulley 12b, and a belt 12c engaged with the two pulleys 12a and 12b. The torque of the crankshaft 11a is input to the drive pulley 12a and is transmitted to the driven pulley 12b via the belt 12c. The structure of the transmission 12 is not limited to the example in the snow mobile 1. In another example, the transmission 12 may be a gear-type transmission that has a plurality of transmission gears.

As shown in FIG. 1, the driven pulley 12b is fixed to the secondary shaft 13 and is rotatable together with the shaft 13. The track belt drive shaft 14 is linked to the secondary shaft 13 via a belt, a chain, or the like, and receives a torque from the secondary shaft 13 to rotate. The track belt drive shaft 14 has a sprocket 14b disposed inside, and engaged with, the track belt 16. Guide wheels 15a, 15b and 15c for guiding the track belt 16, and a slide rail 17 for guiding the track belt 16, are arranged inside the track belt 16. The slide rail 17 presses the track belt 16 onto the snow surface.

The snow mobile 1 includes a seat 8 that allows the driver to straddle thereon (sit astride thereon). As shown in FIG. 1, the seat 8 is located upward from the track belt 16. The fuel tank 9 is located in front of the seat 8. The snow mobile 1 includes, in front of the seat 8, a steering handle 21 for steering the skis 4R and 4L. In addition, the snow mobile 1 includes a steering column 22 extending diagonally downward and forward from the steering handle 21. The steering handle 21 is linked to a knuckle 32 (described later) through the steering column 22 and a tie rod (not shown).

[Summary of Suspension]

The snow mobile 1 includes a suspension 30 in the front portion of the vehicle body. As shown in FIG. 2, the suspension 30 includes a right suspension mechanism 31R located rightward from the front portion 3C of the vehicle body frame 3, and a left suspension mechanism 31L located leftward from the front portion 3C. (In the following description, the front portion 3C of the vehicle body frame 3 will be referred to as "frame front portion".) On the right side of the frame front portion 3C is located a vehicle body supporting member to be in contact with a snow surface and support the vehicle body through the right suspension mechanism 31R. Also, on the left side of the frame front portion 3C is located a vehicle body supporting member to be in contact with the snow surface and support the vehicle body through the left suspension mechanism 31L. The snow mobile 1 includes a right ski 4R and a left ski 4L as the vehicle body supporting members. The right suspension mechanism 31R and the left suspension mechanism 31L have a symmetrical structure with respect to the center C2 (see FIG. 3) in the right-left direction (X1-X2 direction). In the following description, reference numeral "31" is used for the suspension mechanisms 31R and 31L in descriptions common to the right and left suspension mechanisms 31R and 31L. Further, in the following description, reference numeral "4" is used for the skis 4R and 4L in descriptions common to the right and left skis 4R and 4L.

As shown in FIG. 2, each suspension mechanism includes a knuckle 32. The ski 4 is joined with the lower end of the knuckle 32. Specifically, the lower end of the knuckle 32 is joined with the ski 4 through a shaft extending in the vehicle width direction (X1-X2 direction). The knuckle 32 and the ski 4 turn to the right or the left together with each other according to the movement of the tie rod, the steering column 22, and the steering handle 21.

As shown in FIG. 2, each of the suspension mechanisms 31 includes an upper arm 33 connecting the knuckle 32 and the frame front portion 3C, and a lower arm 34 located under the upper arm 33 and connecting the knuckle 32 and the frame front portion 3C.

As shown in FIG. 2, the proximal portions 33a and 33b of the upper arm 33 are joined to the frame front portion 3C. The upper arm 33 extends outward in the right-left direction from the proximal portions 33a and 33b. Specifically, the upper arm 33 of the right suspension mechanism 31R extends rightward from the proximal portions 33a and 33b, and the upper arm 33 of the left suspension mechanism 31L extends leftward from the proximal portions 33a and 33b. The upper arm 33 includes a front rod 33f and a rear rod 33r located rearward from the front rod 33f. The proximal portion 33a of the front rod 33f and the proximal portion 33b of the rear rod 33r are spaced apart from each other in the front-rear direction. The arm 33 is movable in an up and down direction around the proximal portions 33a and 33b. In the example, the proximal portions 33a and 33b are tubular portions, and are joined to the frame front portion 3C via a shaft disposed in the tubular portion. The shaft is held by an arm support portion 3a (see FIG. 4) fixed on the side face of the frame front portion 3C. The upper arm 33 (in other words, the rods 33f and 33r) is movable in an up and down direction around the shaft disposed in the proximal portions 33a and 33b. Like the upper arm 33, the lower arm 34 is also movable in an up and down direction around the proximal portions 34a and 34b. As a result, the ski 4 is movable in an up and down direction together with the knuckle 32 relative to the vehicle body frame 3.

As shown in FIG. 2, the upper arm 33 includes, at the tip end thereof, a joint portion 33c joined to the upper end of the knuckle 32. In the example, each end of the rods 33f and 33r is connected to the joint portion 33c. The joint portion 33c is exemplified by a ball joint. This allows the angle of the knuckle 32 with respect to the upper arm 33 to change according to the vertical movement of the upper arm 33.

As shown in FIG. 2, the proximal portions 34a and 34b of the lower arm 34 are joined to the frame front portion 3C. The lower arm 34 extends outward in the right-left direction from the proximal portions 34a and 34b. In detail, the lower arm 34 of the right suspension mechanism 31R extends rightward from the proximal portions 34a and 34b, and the lower arm 34 of the left suspension mechanism 31L extends leftward from the proximal portions 34a and 34b. The lower arm 34 includes a front rod 34f and a rear rod 34r located rearward from the front rod 34f. The proximal portion 34a of the front rod 34f and the proximal portion 34b of the rear rod 34r are spaced apart from each other in the front-rear direction. The arm 34 is movable in an up and down direction around the proximal portions 34a and 34b. In the example, the proximal portions 34a and 34b are tubular portions, and are joined to the frame front portion 3C via a shaft disposed in the tubular portion. The shaft is held by an arm support portion 3b fixed on the side face of the frame front portion 3C. The lower arm 34 (in other words, the rods 34f and 34r) is movable in an up and down direction around the shaft disposed in the proximal portions 34a and 34b.

As shown in FIG. 2, the lower arm 34 includes, at the tip end thereof, a joint portion 34c joined to the knuckle 32. In the example, each end of the rods 34f and 34r is connected to the joint portion 34c. The knuckle 32 includes a front pillar 32a and a rear pillar 32b. The knuckle 32 further includes a beam 32c connecting the middle portions of the pillars 32a and 32b. The joint portion 34c of the lower arm 34 is joined to the beam 32c. The upper ends of the pillars 32a and 32b are connected to each other, and their lower ends are also connected to each other. The joint portion 34c is exemplified by a ball joint. This allows the angle of the knuckle 32 with respect to the lower arm 34, to change according to the vertical movement of the upper arm 34.

The structures and the shapes of the arms 33 and 34 are not limited to the examples in the suspension 30. For example, the rods 33f and 33r of the upper arm 33 may extend linearly as shown in FIG. Alternatively, the rods 33f and 33r may be curved. Likewise, the rods 34f and 34r of the lower arm 34 may also extend linearly as shown in FIG. 2. Alternatively, the rods 34f and 34r may be curved. In another example, the joint portion 33c may be fixed to the end of one of the rods 33f and 33r of the upper arm 33, and the other rod may be connected to the middle of the one rod. Similarly, the joint portion 34c may be fixed to the end of one of the rods 34f and 34r of the lower arm 34, and the other rod may be connected to the middle of the one rod. Further, the shape and the structure of the knuckle 32 are not limited to the example in the suspension 30. In another example, the knuckle 32 does not include one of two pillars 32a and 32b. That is, the knuckle 32 may consist of only one pillar.

In the example, as shown in FIG. 3, the proximal portions 34a and 34b of the lower arm 34 are located closer to the center C2 in the right-left direction than the proximal portions 33a and 33b of the upper arm 33 in the front view of the vehicle body. Therefore, the distance between the proximal portions 33a and 33b of the right upper arm 33 and the proximal portions 33a and 33b of the left upper arm 33 is larger than the distance between the proximal portions 34a and 34b of the right lower arm 34 and the proximal portions 34a and 34b of the left lower arm 34. In a front view of the vehicle body, the position of the tip end (that is, the joint portion 33c) of the upper arm 33 in the right-left direction is approximately equal to the position of the tip end (that is, the joint portion 34c) of the lower arm 34 in the right-left direction. Therefore, the lower arm 34 is longer than the upper arm 33.

As shown in FIG. 2, each suspension mechanism 31 includes a damper 35. The upper end of the damper 35 is joined with a damper joint portion 3c (see. FIG. 3) formed on the frame front portion 3C. The upper end 35a of the damper 35 are joined to the frame front portion 3C at a higher position than the proximal portions 33a and 33b of the upper arm 33. The damper 35 extends diagonally, downward and outward in the vehicle width direction from the upper end 35a thereof, and is located between the front rod 33f and the rear rod 33r of the upper arm 33. The lower end of the damper 35 is joined to the lower arm 34. The lower arm 34 includes a support plate 34e fixed between the front rod 34f and the rear rod 34r. The lower end of the damper 35 is joined to the support plate 34e.

In the example, the frame front portion 3C is made of a plurality of plates. Specifically, as shown in FIG. 2, the frame front portion 3C includes right and left side panels 3f located apart from each other in the right-left direction, and a front panel 3e fixed on the front edges of the right and left side panels 3f. The arm support portions 3a and 3b that support the arms 33 and 34 and the damper joint portion 3c are fixed to the side panels 3f by welding, or are integrally formed with the side panel 3f.

As shown in FIG. 3, in the example, the side panel 3f is inclined toward the center C2 in the right-left direction, while extending diagonally from a portion to which the proximal portions 33a and 33b of the upper arm 33 are joined (that is, a portion where the arm support portions 3a are located) toward a portion to which the the proximal portions 34a and 34b of the lower arm 34 are joined (that is, a portion where the arm support portions 3b are located). The structure of the frame front portion 3C is not limited to the example described here. In another example, the frame front portion 3C may include a plurality of pillars arranged along the vertical direction, a beam extending in the front-rear direction (or the right-left direction) and connecting the plurality of pillars, and the like. In this case, the arm support portions 3a and 3b and the damper joint portion 3c may be fixed to the beam or the pillars.

As shown in FIG. 1, the vehicle body frame 3 includes a portion supporting the engine 11. (Hereinafter, this portion will be referred to as "engine support portion 3E"). In the example, the engine supporting portion 3E is formed separately from the frame front portion 3C that supports the suspension 30, and is fixed to the frame front portion 3C by fixtures (for example, bolt) or by welding. Unlike the snow mobile 1, the engine support portion 3E may be integrally formed with the frame front portion 3C.

[Lines/Intersection Points Defined in Suspension]

In general, when a snow mobile turns to the left or the right, centrifugal force acts on the vehicle body, which increases the weight applied to the ski on the outer side and thus reduces the contact pressure between the snow surface and the ski on the inner side. For example, when a snow mobile turns to the right, the weight applied to the left ski increases and the contact pressure between the snow surface and the right ski reduces. The suspension 30 is configured to prevent the reduction of the contact pressure between the ski on the inner side and the snow surface when the snow mobile 1 turns. In the following description, the structure of the suspension 30 will be described in detail.

Figure 5:
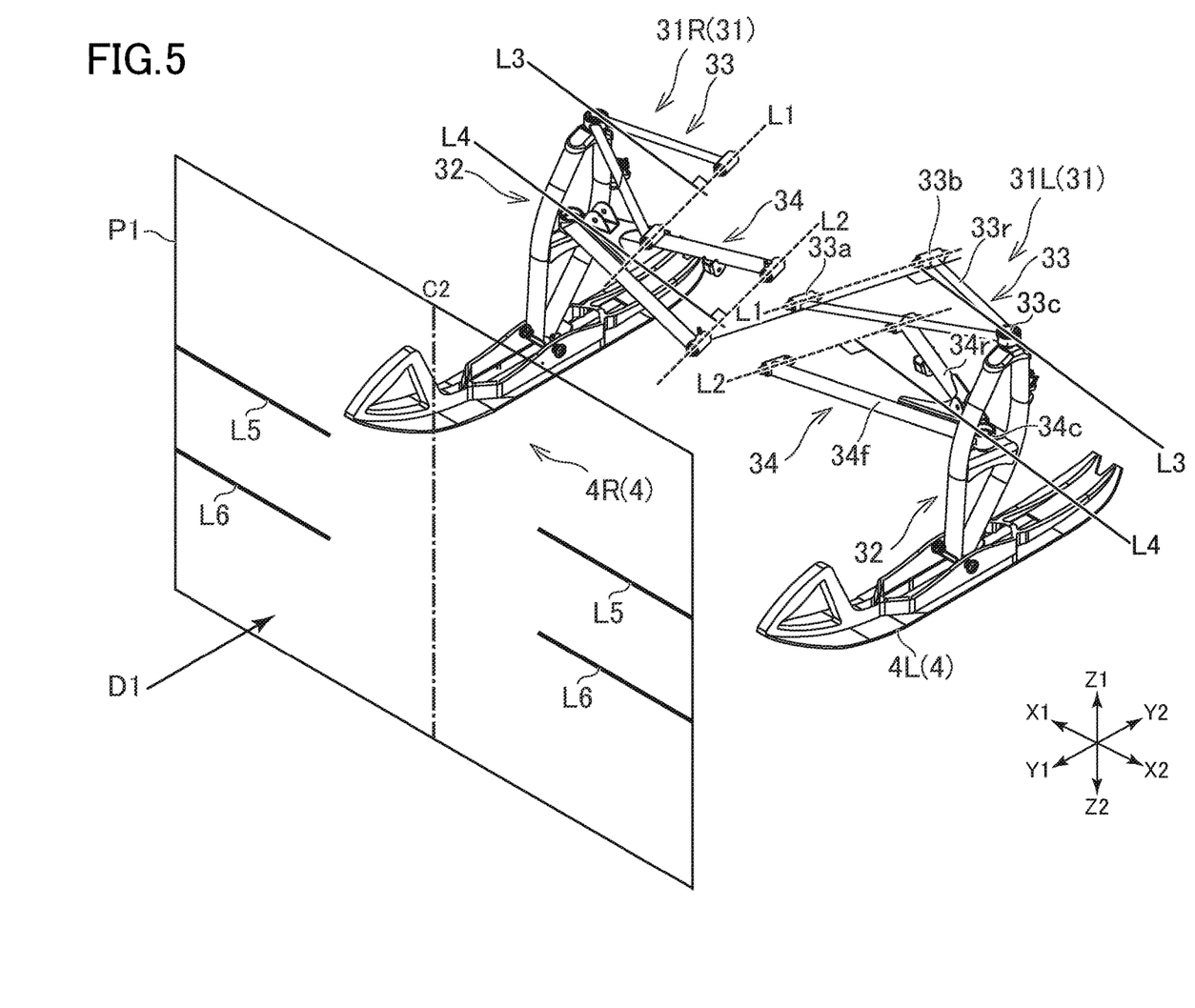
FIG. 5 is for explaining an example of the suspension. This figure illustrates imaginary lines defined for the suspension.
Figure 6:
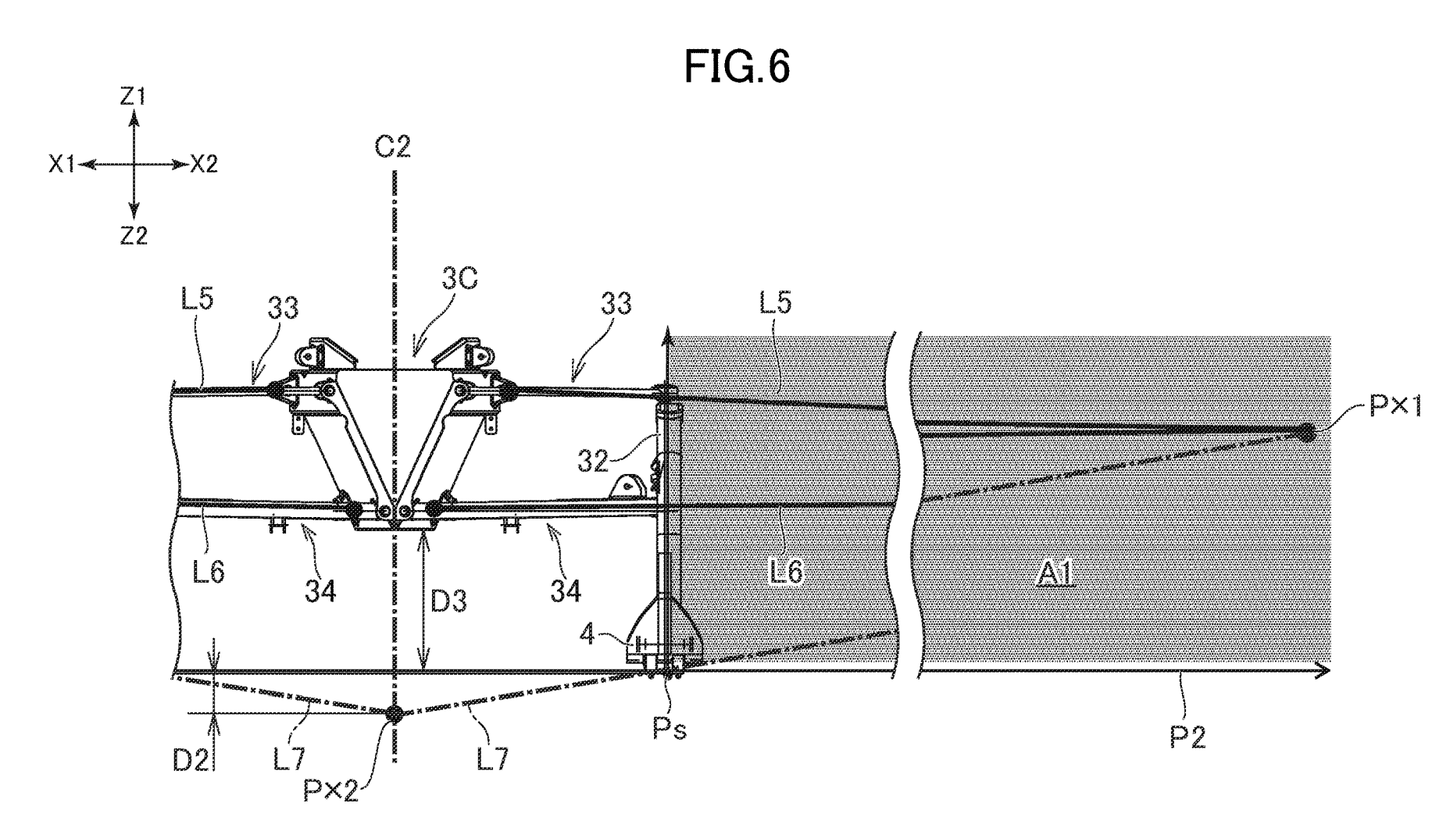
FIG. 6 illustrates imaginary lines defined in an imaginary plane perpendicular to the front-rear direction of the vehicle body.
Figure 7:
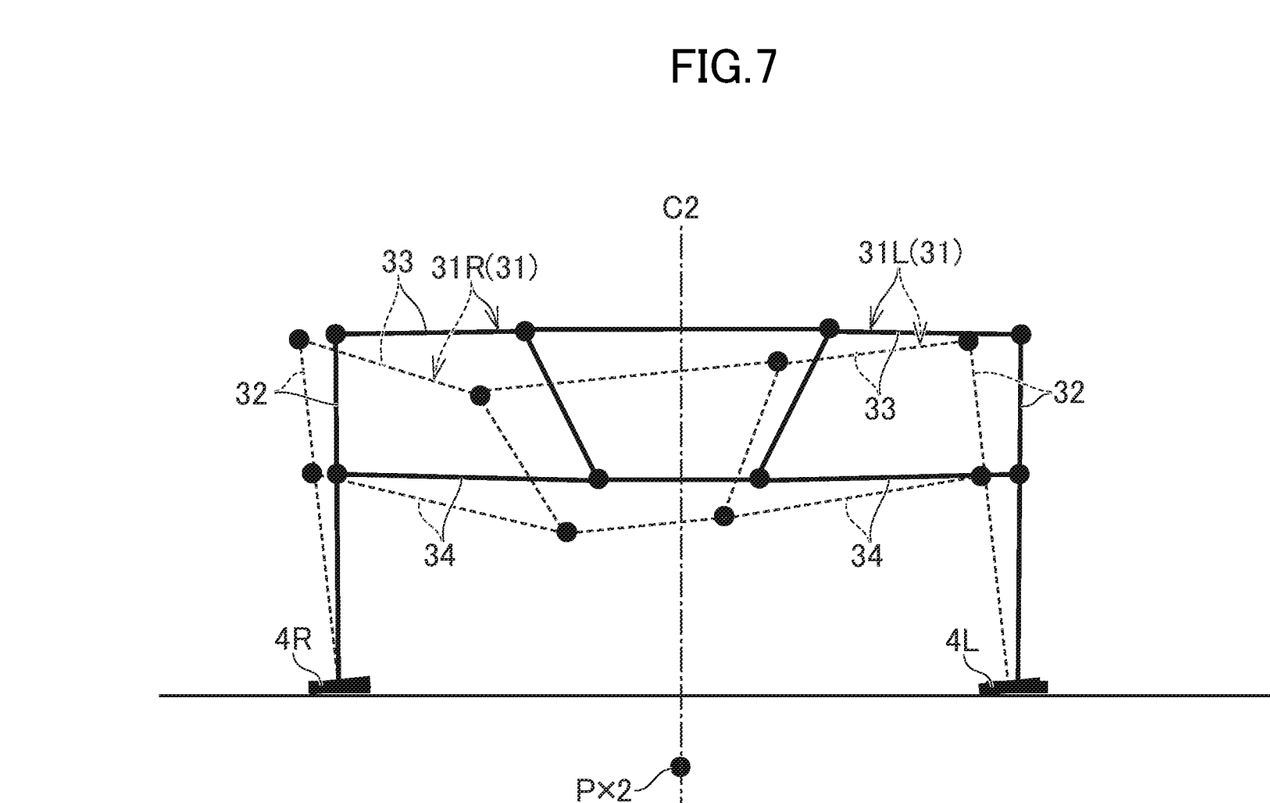
FIG. 7 is for explaining a movement of the suspension during turning of the snow mobile.

FIG. 5 is for explaining the suspension 30. This figure illustrates imaginary lines L1, L2, L3 and L4 defined for the suspension 30. FIG. 6 is for explaining imaginary lines L5, L6 and L7 defined on an imaginary plane P1 perpendicular to the front-rear direction of the vehicle body. FIG. 6 illustrates a state where the plane P1, shown in FIG. 5, is viewed in the direction of the arrow D1. FIG. 7 is for explaining a movement of the suspension 30 during turning of the snow mobile 1. The solid line in FIG. 7 illustrates a state where the vehicle body is placed horizontally and a broken line in the same illustrates a state of the vehicle body at the time of turning.

Imaginary lines for the upper arm 33 are defined as follows. The upper arm 33 is movable in an up and down direction around the shaft disposed in the proximal portions 33a and 33b. The line L1 shown in FIG. 5 is a straight line passing through the center of this shaft. Therefore, the upper arm 33 is movable in an up and down direction around the straight line L1. (Hereinafter, this straight line L1 will be referred to as "upper arm axis".) As shown in FIG. 4, in the example, the proximal portion 33b of the rear rod 33r is located farther outward in the right-left direction than the proximal portion 33a of the front rod 33f. Therefore, the arm axis L1 is inclined with respect to the front-rear direction in a plan view of the vehicle body. One of the two proximal portions 33a and 33b may be located higher than the other proximal portion in a side view of the vehicle body. This case results in inclination of the arm axis L1 with respect to the front-rear direction in a side view of the vehicle body. Alternatively, the proximal portions 33a and 33b of the upper arm 33 may be located at the same height in the side view of the vehicle body. In this case, the arm axis L1 is parallel to the front-rear direction in the side view of the vehicle body.

The upper arm 33 includes, at the tip end thereof, the joint portion 33c joined to the upper end of the knuckle 32. As described above, the joint portion 33c is exemplified by a ball joint. A line L3 shown in FIG. 5 is a straight line connecting the joint portion 33c and the upper arm axis L1. In detail, the line L3 is a straight line perpendicular to the upper arm axis L1 and passing through the center ball of the ball joint and through the upper arm axis L1. (Hereinafter, this straight line L3 will be referred to as "upper arm line"). The positional relationship between the upper arm line L3 and the rods 33f and 33r includes various embodiments. In an example, the upper arm line L3 passes through between the two rods 33f and 33r in a plan view of the vehicle body. Alternatively, the upper arm line L3 may pass through the outside (in other words, the front side or the rear side) of the rods 33f and 33r.

Imaginary lines are defined for the lower arm 34 like the upper arm 33. In detail, a line L2 shown in FIG. 5 is a straight line passing through the center of the shaft disposed in the proximal portions 34a and 34b of the lower arm 34. Therefore, the upper arm 34 is movable in an up and down direction around the straight line L2. (Hereinafter, this straight line L2 will be referred to as "lower arm axis".) In the example, the proximal portion 34b of the rear rod 34r is located farther outward in the right-left direction than the proximal portion 34b of the front rod 34f. Therefore, the lower arm axis L2 is inclined with respect to the front-rear direction in a plan view of the vehicle body. One of the two proximal portions 34a and 34b may be located higher than the other proximal portion in a side view of the vehicle body. This case results in an inclination of the arm axis L2 with respect to the front-rear direction in a side view of the vehicle body. Alternatively, the proximal portions 34a and 34b of the lower arm 34 may be located at the same height in the side view of the vehicle body. In this case, the lower arm axis L2 is parallel to the front-rear direction in a side view of the vehicle body.

The lower arm 34 includes, at the tip end thereof, the joint portion 34c joined to the knuckle 32. As described above, the joint portion 34c is exemplified by a ball joint. A line L4 shown in FIG. 5 is a straight line connecting the joint portion 34c and the upper arm axis L2. In detail, the line L4 is a straight line perpendicular to the lower arm axis L2 and passing through the center ball of the ball joint and through the lower arm axis L2. (Hereinafter, this line L4 will be referred to as "lower arm line".) The lower arm line L4 may pass between the two rods 34f and 34r in a plan view of the vehicle body. Alternatively, the lower arm line L4 may pass through the outside (in other words, the front side or the rear side) of the rods 34f and 34r.

The line L5 shown in FIG. 5 is a straight line obtained by projecting the upper arm line L3 onto a plane P1. (The plane P1 in FIG. 5 is an imaginary plane perpendicular to the front-rear direction of the vehicle body. In the following description, the plane P1 will be referred to as "projection plane".) In other words, the upper arm line L3 is projected onto the projection plane P1 to form the straight line L5 when the upper arm line L3 is viewed in the direction indicated by the arrow D1 in FIG. 5. (Hereinafter, the straight line L5 will be referred to as "upper arm projected line"). Further, the line L6 shown in FIG. 5 is a straight line obtained by projecting the lower arm line L4 onto the projection plane P1. In other words, the lower arm line L4 is projected onto the projection plane P1 to form the straight line L6 when the lower arm line L4 is viewed in the direction indicated by the arrow D1 in FIG. 5. (Hereinafter, the straight line L6 will be referred to as "lower arm projected line").

In the example, as shown in FIG. 6, the arm projected lines L5 and L6 intersect at a point Px1 in the projection plane P1. (This point Px1 will be hereinafter referred to as "projected line intersection point".) The upper arm 33 and the lower arm 34 are configured so that the projected line intersection point Px1 is positioned above a horizontal plane P2 and located father outward in the right-left direction than the ski 4. (The horizontal plane P2 is a plane passing through the lower end of the ski 4.) In other words, the projected line intersection point Px1 is positioned within a region A1 defined higher than the horizontal plane P2 and defined farther outward in the right-left direction than the ski 4. The shaded area in FIG. 6 is the region A1.

In the example, in a front view of the vehicle body, the upper arm projected line L5 extends diagonally, downward and outward in the right-left direction of the vehicle body from the proximal portions 33a and 33b of the upper arm 33 (that is, from a position of the proximal portions 33a and 33b projected onto the projection plane P1.). This enables the height of the knuckle 32 to be reduced. The angle of the lower arm projected line L6 with respect to a horizontal plane is smaller than the angle of the lower arm projected line L5 with respect to the horizontal plane. This enables the projected line intersection point Px1 to exist in the region A1. In the example, while the upper arm projected line L5 is inclined with respect to the horizontal plane, the lower arm projected line L6 is arranged substantially horizontally. Unlike the suspension 30, the lower arm projected line L6 may extend diagonally, downward and outward in the right-left direction.

The inclination of the arm projected lines L5 and L6 is not limited to the example in the suspension 30 as long as the projected line intersection point Px1 is located in the region A1. For example, in a front view of the vehicle body, the lower arm projected line L6 may extend diagonally, upward and outward in the right-left direction of the vehicle body from the proximal portions 34a and 34b of the lower arm 34 (that is, from a position of the proximal portions 34a and 34b projected onto the projection plane P1.). On the other hand, the angle of the upper arm projected line L5 with respect to a horizontal plane may be smaller than the angle of the lower arm projected line L6 with respect to the horizontal plane. In this case, the lower arm projected line L6 may be inclined with respect to the horizontal plane, and the upper arm projected line L5 may be arranged substantially horizontally. In still another example, the upper arm projected line L5 may extend diagonally, upward and outward in the right-left direction of the vehicle body from the proximal portions 33a and 33b of the upper arm 33 (that is, from a position of the proximal portions 33a and 33b projected onto the projection plane P1.).

The joint portion 33c (in other words, the center of the ball joint) of the upper arm 33 is deviated in the front-rear direction from the vertical line Lv1 (see FIG. 4) passing through the joint portion 34c (in other words, through the center of the ball joint) of the lower arm 34. In the example, the joint portion 33c of the upper arm 33 is located farther rearward from the vertical line Lv1. Therefore, no flat plane contains both of the upper arm line L3 and the lower arm line L4. For the reason, in the present disclosure, the arm lines L3 and L4 defines the arm projected lines L5 and L6 in the projection plane P1, and the arm projected lines L5 and L6 defines the intersection point Px1. Unlike the suspension 30, the vertical line Lv1 may pass through both of the joint portion 33c of the upper arm 33 and the joint portion 34c of the lower arm 34.

The line L7 shown in FIG. 6 and defined on the projection plane P1 is a straight line passing through the projected line intersection point Px1 and through a position Ps of the lower end of the ski 4 projected onto the projection plane P1. (Hereafter, this straight line L7 will be referred to as "lower end inclination line".) As described above, the right suspension mechanism 31R and the left suspension mechanism 31L are symmetrical with respect to the center C2 in the right-left direction of the vehicle body. Therefore, as shown in FIG. 6, the arm projected lines L5 and L6, the projected line intersection point Px1 and the lower end inclination line L7 are defined for each of the right and left suspension mechanisms 31R, 31L. Note that, in the present description, the "lower end of the ski 4" means the center of the lower surface of the ski 4 in the right-left direction.

The point Px2 shown in FIG. 6 is a point of intersection between the lower end inclination line L7 of the right suspension mechanism 31R and the lower end inclination line L7 of the left suspension mechanism 31L. (Hereinafter, the point Px2 will be referred to as "center intersection point".) In other words, the center intersection point Px2 is the intersection between a vertical plane passing through the center C2 in the right-left direction of the vehicle body and the lower end inclination line L7. As described above, the projected line intersection point Px1 is positioned higher than the horizontal plane P2 passing through the lower end of the ski 4, and located farther outward in the right-left direction than the ski 4. Accordingly, this makes the center intersection point Px2 located lower than the horizontal plane P2.

When the snow mobile 1 turns, locating the center intersection point Px2 below the horizontal plane P2, as shown in FIG. 7, makes the vehicle body inclined substantially around the center intersection point Px2 and lowers the position of the vehicle body. More specifically, when the snow mobile 1 turns, the inner portion of the vehicle body goes down and the outer portion of the vehicle body goes down further. When the snow mobile 1 turns, for example, to the left, the left portion of the vehicle body goes down, and the right portion goes down further. This prevents the contact pressure between the inner ski and the snow surface from decreasing when the snow mobile 1 turns, and enables the snow mobile 1 to turn with both the inner ski and the outer ski sufficiently pressed on the snow surface. As a result, turning performance of the snow mobile 1 can be improved. When conventional snow mobiles turn in which the center intersection point Px2 is positioned higher than the horizontal plane P2, that is, in which the projected line intersection point Px1 is positioned lower than the horizontal plane P2, the outer portion of the vehicle body does not sufficiently go down and thus the inner portion of the vehicle body goes up. This reduces the contact pressure between the inner ski and the snow surface.

The distance D2 (see FIG. 6) between the horizontal plane P2 and the center intersection point Px2 is, for example, equal to, or less than 20 millimeters. The distance D2 between the horizontal plane P2 and the center intersection point Px2 is preferably equal to, or less than 18 millimeters. The distance D2 between the horizontal plane P2 and the center intersection point Px2 is more preferably 15 millimeters or less, and 10 millimeters or more.

The distance D3 (see FIG. 6) between the horizontal plane P2 and the lower end of the frame front portion 3C is, for example, 120 millimeters or more. The distance D3 is preferably 150 millimeters or more. The distance D3 is more preferably 200 millimeters or more.

The aforementioned positions of the projected line intersection point Px1 and the center intersection point Px2 can be realized by adjustment of, for example, the height of the proximal portions 33a, 33b, 34a, and 34b of the arms 33 and 34, the height of the joint portions 33c and 34c, the lengths of the arms 33 and 34, the length of the damper 35, and the height of the knuckle 32.

The projected line intersection point Px1 may exist in the region A1 in a state in which a load is applied to the vehicle body (for example, a state in which body weight (50 kilogram (kg) to 70 kg) of a person is applied to the vehicle body). In detail, the projected line intersection point Px1 may be located at the same height as the horizontal plane P2 or below the horizontal plane P2, when the vehicle body has no load. Then, when the body weight is applied to the vehicle body, the projected line intersection point Px1 may be located above the horizontal plane P2. This suspension is also within the scope of the invention. When the snow mobile 1 turns, the above-mentioned weight of a person is applied to the vehicle body. Like the structure described above, the structure where the projected line intersection point Px1 is located above the horizontal plane P2 only when the weight is applied to the vehicle body, prevents the contact pressure between the inner ski and the snow surface from decreasing.

MODIFIED EXAMPLE

Embodiments of the present invention are not limited to the suspension 30 described above, and various modifications may be made.

Figure 8:
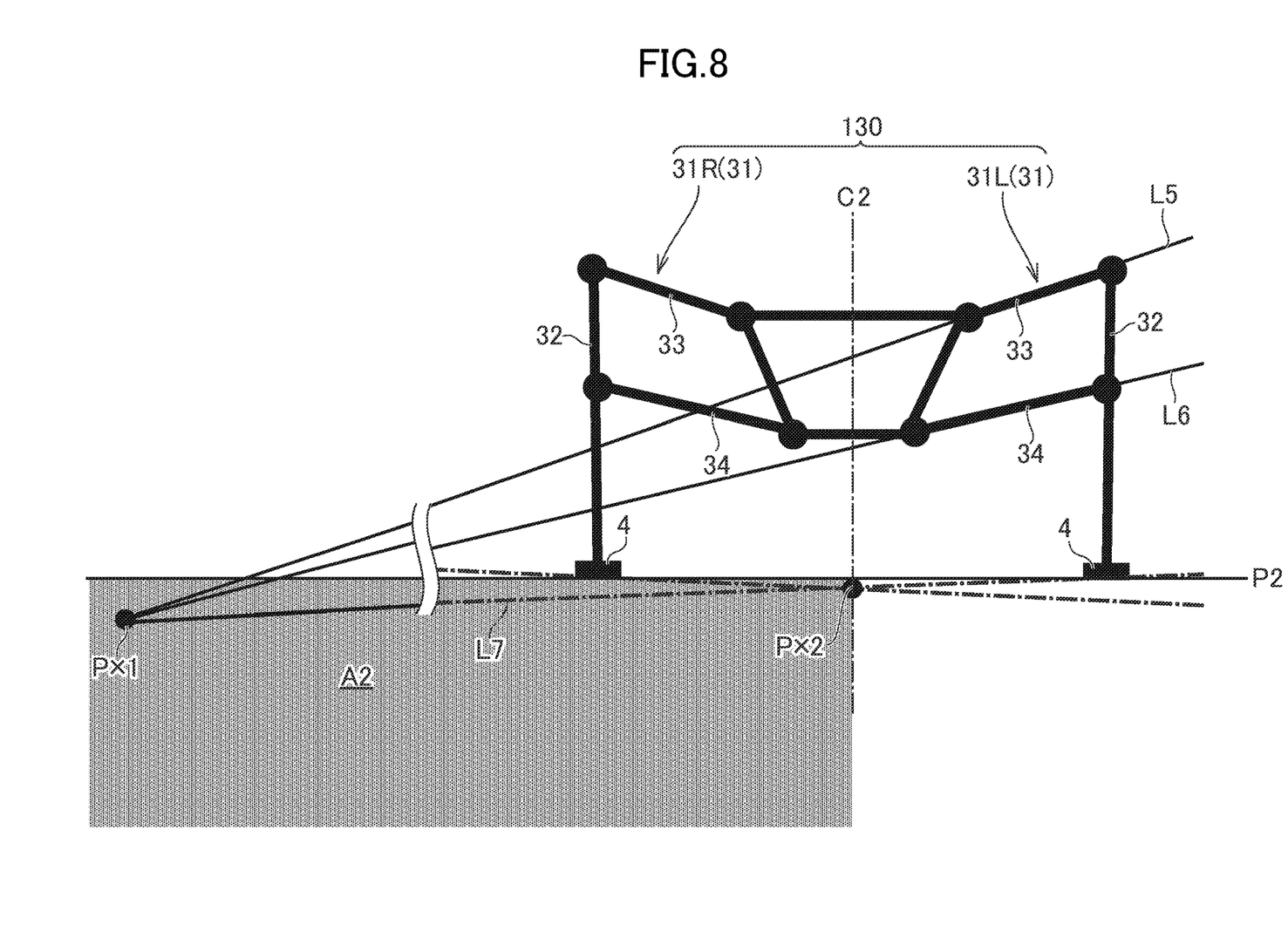
FIG. 8 is a schematic front view showing a modified example of the suspension.

FIG. 8 is for explaining a modified example of the suspension 30. In this figure, a suspension 130 is schematically shown as the modified example. In this figure, the same reference numerals are donated to the same elements as the above-described elements.

Similarly to FIG. 6, this figure illustrates the upper arm projected line L5, the lower arm projected line L6, the projected line intersection point Px1, the lower end inclination line L7, and the center intersection point Px2. In the suspension 130, the projected line intersection point Px1 is located in a region A2 that is defined lower than the horizontal plane P2 passing through the lower end of the ski 4 and defined on the side opposite to the ski 4 across the center C2 in the right-left direction. A region shaded in FIG. 8 is the region A2. In detail, the projected line intersection point Px1 for the right suspension mechanism 31R is located lower that the horizontal plane P2 and located leftward from the center C2 of the vehicle body. The projected line intersection point Px1 for the left suspension mechanism 31L is located lower than the horizontal plane P2 and located rightward from the center C2 of the vehicle body.

In the example, locating the projected line intersection point Px1 in the region A2 makes the center intersection point Px2 be located below the horizontal plane passing through the lower end of the ski 4. This makes the vehicle body be inclined substantially around the center intersection point Px2 and lowers the position of the vehicle body, when the snow mobile 1 turns. More specifically, when the snow mobile 1 turns, the inner portion of the vehicle body goes down and the outer portion of the vehicle body goes down further This prevents the contact pressure between the inner ski and the snow surface from decreasing when the snow mobile 1 is turning, and enables the snow mobile 1 to turn with both the inner ski and the outer ski sufficiently pressed onto the snow surface.

In the example, in a front view of the vehicle body, the lower arm projected line L6 extends diagonally, upward and outward in the right-left direction of the vehicle body from the proximal portions 34*a* and 34*b* of the lower arm 34 (that is, from a position of the proximal portions 34*a* and 34*b* projected onto the projection plane P1.). The angle of the upper arm projected line L5 with respect to a horizontal plane is larger than the angle of the lower arm projected line L6 with respect to the horizontal plane. In other words, the upper arm projected line L5 extends diagonally, upward and outward in the right-left direction of the vehicle body from the proximal portions 33*a* and 33*b* of the upper arm 33 (that is, from a position of the proximal portions 33*a* and 33*b* projected onto the projection plane P1), while being more largely inclined with respect to the horizontal plane than the lower arm projected line L6. This makes the projected line intersection point Px1 exist in the region A2.

Also in the suspension 130, the distance D2 (see FIG. 6) between the horizontal plane P2 and the center intersection point Px2 is, for example, equal to, or less than 20 millimeters. The distance D2 between the horizontal plane P2 and the center intersection point Px2 is preferably equal to, or less than 18 millimeters. The distance D2 between the horizontal plane P2 and the center intersection point Px2 is more preferably 15 millimeters or less, and 10 millimeters or more.

[All-Terrain Vehicle]

Figure 9:
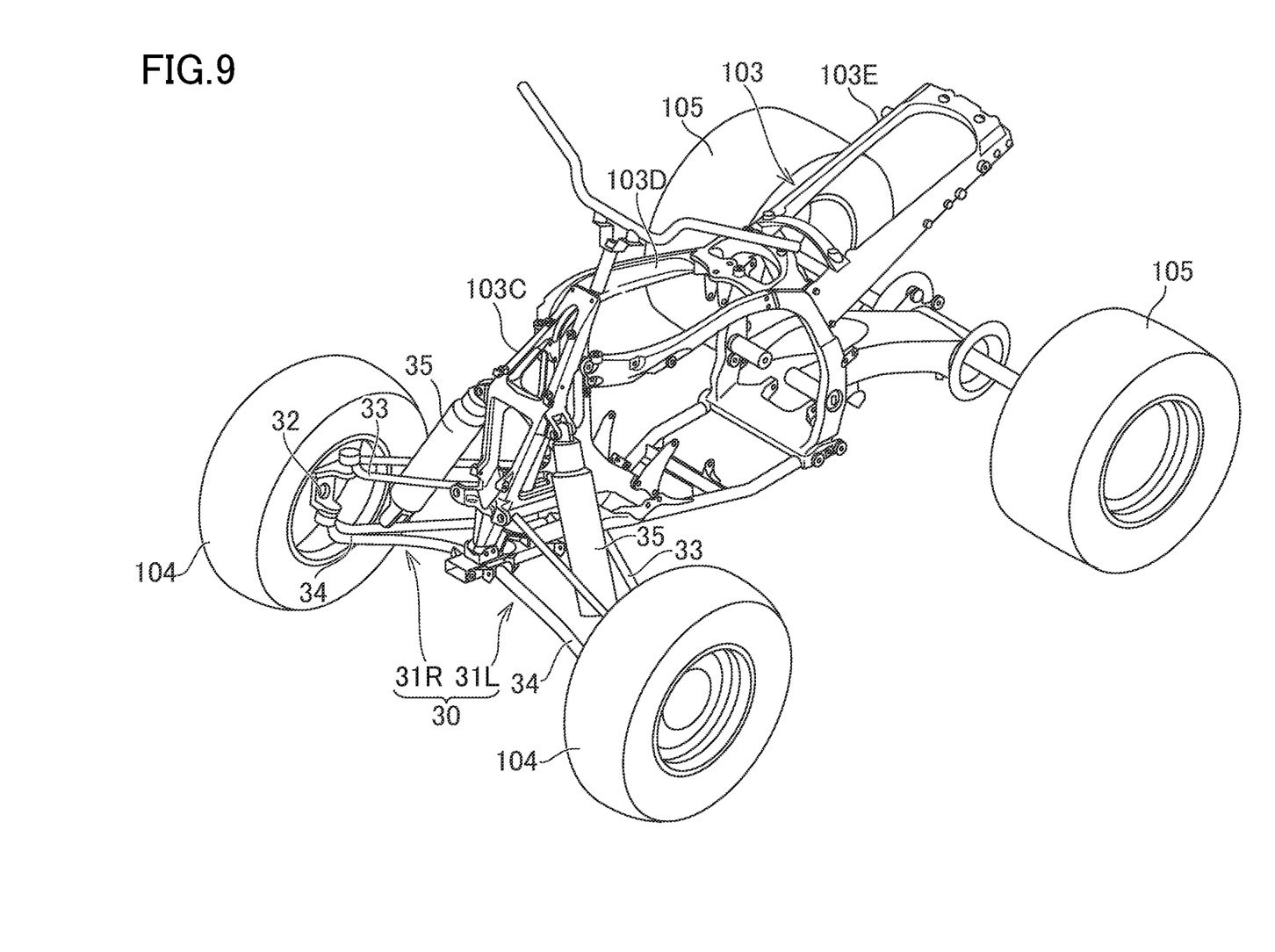
FIG. 9 is a perspective view of an example of an all-terrain vehicle including an example of the suspension proposed in the present disclosure.

The suspensions 30 and 130 described above may be applied to straddle-type vehicles different from the snow mobile. For example, as shown in FIG. 9, the suspensions 30 and 130 may be applied to the all-terrain vehicle 100.

The all-terrain vehicle 100 includes the suspension 30 in the front portion of the vehicle body. The suspension 30 includes the above-described right suspension mechanism 31R, which is located rightward from the vehicle body frame 103 (from a frame front portion 103C), and the above-described left suspension mechanism 31L, which is located leftward from the the frame front portion 103C. In addition, each suspension mechanism 31 includes a knuckle 35. The all-terrain vehicle 100 includes left and right front wheels 104 and left and right rear wheels 105. The front wheel 104 is a vehicle body supporting member that supports the vehicle body through the suspension mechanism 31. The knuckle 32 is joined to the inside of the front wheel 104 and is allowed to turn to the right or left together with the front wheel 104.

When the arm axes L1 and L2, the arm line L3 and L4, the arm projected line L5 and L6, and the projected line intersection point Px1 is defined for the suspension 30 of the all-terrain vehicle 100, then the projected line intersection point Px1 is located higher than a horizontal plane (that is, road surface) that passes through the lower end of the front wheel (that is, through a portion contact with the road surface), and is located farther outward in the right-left direction than the front wheel 104. In other words, the projected line intersection point Px1 exists in the region A1 (see FIG. 6) defined above the horizontal plane P2 and defined farther outward in the right-left direction than the front wheel 104. As a result, the center intersection point Px2 between the lower end inclination lines L7 for the right and left suspension mechanisms 31R and 31L is located below the horizontal plane P2. In the present example, the line L7 is a straight line passing through the projected line intersection point Px1 and through a position of the lower end of the front wheel 104 projected onto the projection plane P1. The "lower end of the front wheel 104" is the center in the right-left direction of a portion of the tire that contacts the road surface.

The suspension 130 described in FIG. 8 may be employed in the all-terrain vehicle 100. Specifically, the projected line intersection point Px1 in the all-terrain vehicle 100 may be defined below the horizontal plane passing through the lower end of the front wheel 104 and defined on the opposite side of the front wheel 104 across the center C2 in the right-left direction.

The vehicle body frame 103 of the all-terrain vehicle 100 includes an engine support portion 103D for supporting an engine (not shown) and a seat support portion 103E for supporting a seat (not shown) behind a frame front portion 103C to which the suspension mechanisms 31 is joined.

As described above, the suspensions 30 and 130 include the right suspension mechanism 31R located rightward from the vehicle body frame and the left suspension mechanism 31L located leftward from the vehicle body frame. Each of the right suspension mechanism 31R and the left suspension mechanism 31L comprises the upper arm 33, the lower arm 34, and the knuckle 32 joined to the vehicle body supporting member (that is, the ski 4 or the front wheel 104). The upper arm 33 includes the proximal portion 33*a* and 33*b* joined to the vehicle body frame 103 and the joint portion 33*c* joined to the knuckle 32. The upper arm 33 is movable in an up and down direction around the upper arm axis L1 passing through the proximal portion 33*a* and 33*b*. The lower arm 34 includes the proximal portion 34*a* and 34*b* joined to the vehicle body frame 103 and the joint portion 34*c* joined to the knuckle 32. The lower arm 34 is movable in an up and down direction around the lower arm axis L2 passing through the proximal portion 34*a* and 34*b*. Further, the imaginary lines have been defined as follows.

The upper arm line L3: a straight line that passes through the joint portion 33*c*, intersects the upper arm axis L1, and is perpendicular to the upper arm axis L1

The lower arm line L4: a straight line that passes through the joint portion 34*c*, intersects the lower arm axis L2, and is perpendicular to the lower arm axis L2

The upper arm projected line L5: a straight line formed by projecting the upper arm line L3 onto the projection line P1

The lower arm projected line L6: a straight line formed by projecting the lower arm line L4 onto the projection line P1

The projected line intersection point Px1: the point of intersection between the upper arm projected line L5 and the lower arm projected line L6

Wherein the projected line intersection point Px1 in the suspension 30 exists in the region A1 defined higher than the horizontal plane P2 and defined farther outward in the right-left direction than the vehicle body supporting member. Alternatively, the projected line intersection point Px1 in the suspension 130 exists in the region A2 that is defined lower than the horizontal plane P2 and defined on the opposite side of the vehicle body supporting member across the center C2 in the right-left direction. The suspensions 30 and 130 improve the turning performance of the straddle-type vehicle.

The joint portion 33*c* of the upper arm 33 is deviated in the front-rear direction from the vertical line Lv1 passing through the joint portion 34*c* of the lower arm 34. Therefore, no flat plane contains both of the upper arm line L3 and the lower arm line L4.

Below the horizontal plane P2 exists the center intersection point Px2 that is a point of intersection between the vertical plane at the center C2 of the vehicle body in the right-left direction and the lower end inclination line L7, wherein the lower end inclination line L7 is a line passes through the projected line intersection point Px1 and through a position Ps of the lower end of the vehicle body supporting member projected onto the projection plane P1.

The distance between the center intersection point Px2 and the horizontal plane P2 is equal to or lower than 20 millimeters. This enables the turning performance of the straddle-type vehicle to be further improved.

The proximal portions 34a and 34b of the lower arm 34 are located closer to the center C2 in the right-left direction than the proximal portions 33a and 33b of the upper arm 33.

In the suspension 30 as an example, in a front view of the vehicle body, the upper arm line L5 extends diagonally, downward and outward in the right-left direction of the vehicle body from the proximal portion 33a and 33b of the upper arm 33. Then, the angle between the lower arm line L6 and the horizontal plane is smaller than the angle between the upper arm line L5 and the horizontal plane. This makes the projected line intersection point Px1 exist in the region A1. On other hand, in the suspension 130 as another example, the lower arm projected line L6 extends diagonally, upward and outward in the right-left direction of the vehicle body from the proximal portions 34a and 34b of the lower arm 34. Then, the angle of the upper arm projected line L5 with respect to the horizontal plane is larger than the angle of the lower arm projected line L6 with respect to the horizontal plane. This makes the projected line intersection point Px1 exist in the region A2.

The distance D3 (see FIG. 6) between the horizontal plane P2 and the lower end of the frame front portion 3C is, for example, equal to, or larger than, 120 millimeters.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A suspension for a straddle-type vehicle that includes a vehicle body frame and a vehicle body supporting member including a lower end to be in contact with a snow surface or a road surface, the suspension comprising:
a right suspension mechanism located rightward from the vehicle body frame; and
a left suspension mechanism located leftward from the vehicle body frame, wherein
each of the right suspension mechanism and the left suspension mechanism comprises:
a knuckle joined to the vehicle body supporting member;
an upper arm including an upper proximal portion joined to the vehicle body frame and an upper joint portion joined to the knuckle, the upper arm being movable in an up and down direction around a first straight line passing through the upper proximal portion; and
a lower arm disposed under the upper arm, the lower arm including a lower proximal portion joined to the vehicle body frame and a lower joint portion joined to the knuckle, the lower arm being movable in an up and down direction around a second straight line passing through the lower proximal portion; wherein
a third line is a straight line that passes through the upper joint portion, intersects the first straight line, and is perpendicular to the first straight line;
a fourth line is a straight line that passes through the lower joint portion, intersects the second straight line, and is perpendicular to the second straight line;
a fifth line is a straight line in an imaginary plane perpendicular to a front-rear direction of the vehicle and formed by projecting the third line onto the imaginary plane;
a sixth line is a straight line in the imaginary plane and formed by projecting the fourth line onto the imaginary plane,
a first region is defined higher than a horizontal plane passing through the lower end of the vehicle body supporting member and defined outside of the vehicle body supporting member in a right-left direction of the vehicle body; and
a second region is defined lower than a horizontal plane that passes through the lower end of the vehicle body supporting member and is defined on a side opposite to the vehicle body supporting member across a center of the vehicle body in the right-left direction,
wherein
a first intersection point that is a point of intersection between the fifth line and the sixth line is located in the first region or the second region.

2. The suspension according to claim 1, wherein
the upper joint portion is deviated in position from a vertical line that passes through the lower joint portion.

3. The suspension according to claim 1, wherein
no flat plane contains both the third line and the fourth line.

4. The suspension according to claim 1, wherein
a second intersection point is located lower than the horizontal plane that passes through the lower end of the vehicle body supporting member, where the second intersection point is a point of intersection between a vertical plane at a center of the vehicle body in the right-left direction and a seventh line, and where the seventh line is a straight line that passes through both the first intersection point and a point corresponding to the lower end of the vehicle body supporting member projected onto the imaginary plane.

5. The suspension according to claim 4, wherein
a distance between the second intersection point and the horizontal plane is equal to or lower than 20 millimeters.

6. The suspension according to claim 1, wherein
the lower proximal portion is located closer to the center of the vehicle body in the right-left direction than the upper proximal portion.

7. The suspension according to claim 1, wherein
in a front view of the vehicle body, the fifth line extends diagonally, downward and outward in the right-left direction of the vehicle body from the upper proximal portion.

8. The suspension according to claim 7, wherein
an angle between the sixth line and the horizontal plane is smaller than an angle between the fifth line and the horizontal plane.

9. The suspension according to claim 1, wherein
in a front view of the vehicle body, the sixth line extends diagonally, upward and outward in the right-left direction of the vehicle body from the lower proximal portion, and
an angle between the fifth line and the horizontal plane is larger than an angle between the sixth line and the horizontal plane.

10. A straddle-type vehicle comprising:
a vehicle body frame;
a vehicle body supporting member comprising a lower end to be in contact with a snow surface or a road surface;
a right suspension mechanism located rightward from the vehicle body frame; and
a left suspension mechanism located leftward from the vehicle body frame, wherein
each of the right suspension mechanism and the left suspension mechanism comprises:
   a knuckle joined to the vehicle body supporting member;
   an upper arm including an upper proximal portion joined to the vehicle body frame and an upper joint portion joined to the knuckle, the upper arm being movable in an up and down direction around a first straight line passing through the upper proximal portion; and
   a lower arm disposed under the upper arm, the lower arm including a lower proximal portion joined to the vehicle body frame and a lower joint portion joined to the knuckle, the lower arm being movable in an up and down direction around a second straight line passing through the lower proximal portion; wherein
a third line is a straight line that passes through the upper joint portion, intersects the first straight line, and is perpendicular to the first straight line;
a fourth line is a straight line that passes through the lower joint portion, intersects the second straight line, and is perpendicular to the second straight line;
a fifth line is a straight line in an imaginary plane perpendicular to a front-rear direction of the vehicle and formed by projecting the third line onto the imaginary plane;
a sixth line is a straight line in the imaginary plane and formed by projecting the fourth line onto the imaginary plane,
a first region is defined higher than a horizontal plane passing through the lower end of the vehicle body supporting member and defined outside of the vehicle body supporting member in a right-left direction of the vehicle body; and
a second region is defined lower than a horizontal plane that passes through the lower end of the vehicle body supporting member and is defined on a side opposite to the vehicle body supporting member across a center of the vehicle body in the right-left direction,
wherein
a first intersection point that is a point of intersection between the fifth line and the sixth line is located in the first region or the second region.

11. The straddle-type vehicle according to claim 10, wherein
the vehicle body frame includes a front portion joined to the lower proximal portion and the upper proximal portion, and
a horizontal plane that contains the lower end of the vehicle body supporting member has a distance equal to or larger than 120 millimeters from a lower end of the front portion of the vehicle body frame.

12. The straddle-type vehicle according to claim 10, wherein
the vehicle body supporting member is a ski.

13. The straddle-type vehicle according to claim 10, wherein
the vehicle body supporting member is a tire attached to a wheel.

* * * * *